United States Patent
Tsai

(10) Patent No.: US 8,116,888 B2
(45) Date of Patent: Feb. 14, 2012

(54) PARAMETER SETTING SYSTEM AND METHOD FOR PROGRAMMABLE LOGIC CONTROLLER

(75) Inventor: Ming-Chieh Tsai, Taipei Hsein (TW)

(73) Assignee: Foxnum Technology Co., Ltd., Tu-Cheng, New Taipei (TW)

( * ) Notice: Subject to any disclaimer, the term of this patent is extended or adjusted under 35 U.S.C. 154(b) by 350 days.

(21) Appl. No.: 12/430,128

(22) Filed: Apr. 27, 2009

(65) Prior Publication Data

US 2010/0241252 A1 Sep. 23, 2010

(30) Foreign Application Priority Data

Mar. 17, 2009 (CN) .......................... 2009 1 0300901

(51) Int. Cl.
*G05B 19/42* (2006.01)
*G05B 11/01* (2006.01)

(52) U.S. Cl. .................. 700/87; 700/17; 707/E17.008; 707/E17.044

(58) Field of Classification Search .................. 700/87, 700/17, 18; 709/217; 707/E17.008, E17.044
See application file for complete search history.

(56) References Cited

U.S. PATENT DOCUMENTS

| | | | |
|---|---|---|---|
| 6,799,080 B1 * | 9/2004 | Hylden et al. | 700/97 |
| 7,058,693 B1 * | 6/2006 | Baker, Jr. | 709/217 |
| 7,080,137 B2 * | 7/2006 | Brault | 709/224 |
| 7,143,007 B2 * | 11/2006 | Long et al. | 702/184 |
| 7,151,966 B1 * | 12/2006 | Baier et al. | 700/19 |
| 7,240,119 B2 * | 7/2007 | Ascoli et al. | 709/230 |
| 7,257,620 B2 * | 8/2007 | Lo | 709/217 |
| 7,272,458 B2 * | 9/2007 | Tomita | 700/87 |
| 7,294,026 B1 * | 11/2007 | Donnell et al. | 439/701 |
| 7,324,856 B1 * | 1/2008 | Bromley | 700/87 |
| 7,467,018 B1 * | 12/2008 | Callaghan | 700/1 |
| 7,472,386 B2 * | 12/2008 | Lo | 717/173 |
| 7,480,709 B2 * | 1/2009 | Callaghan | 709/223 |
| 7,539,724 B1 * | 5/2009 | Callaghan | 709/205 |
| 7,590,970 B2 * | 9/2009 | Bromley | 700/17 |
| 7,756,966 B2 * | 7/2010 | Callaghan | 709/223 |
| 7,761,765 B2 * | 7/2010 | Yuan et al. | 714/741 |
| 7,781,910 B2 * | 8/2010 | Donnell et al. | 307/42 |
| 7,853,935 B2 * | 12/2010 | Lo | 717/141 |
| 2003/0061274 A1 * | 3/2003 | Lo | 709/203 |

(Continued)

OTHER PUBLICATIONS

Younis, B. and Frey, G., "Visualization of PLC Programs using XML", Jun. 2004, Proceedings of the American Control Conference (ACC2004), Boston, USA, pp. 3082-3087.*

(Continued)

*Primary Examiner* — Kakali Chaki
*Assistant Examiner* — Kelvin Booker
(74) *Attorney, Agent, or Firm* — Altis Law Group, Inc.

(57) ABSTRACT

A parameter setting system for programmable logic controller (PLC) includes a document module, a main program module, a parameter storage module, an interface display module, and a display interface. The document module stores application documents and an extensible markup language (XML) document of PLC. The main program module reads names and scale values of the parameters from the XML document, and outputs a control signal. The parameter storage module stores the names and scale values of the parameters from the main program module. The interface display module receives the control signal from the main program module and reading names and scale values of the parameters from the parameter storage module according to the control signal. The display interface displays the names and scale values of the parameters from the interface display module.

2 Claims, 2 Drawing Sheets

U.S. PATENT DOCUMENTS

| | | | |
|---|---|---|---|
| 2003/0061349 A1* | 3/2003 | Lo et al. | 709/225 |
| 2003/0204560 A1* | 10/2003 | Chen et al. | 709/203 |
| 2004/0243921 A1* | 12/2004 | Carr et al. | 715/500 |
| 2005/0132064 A1* | 6/2005 | Lo | 709/227 |
| 2005/0143851 A1* | 6/2005 | Scalfani et al. | 700/17 |
| 2005/0228517 A1* | 10/2005 | Tomita | 700/87 |
| 2007/0061018 A1* | 3/2007 | Callaghan et al. | 700/1 |
| 2007/0186010 A1* | 8/2007 | Hall et al. | 709/246 |
| 2008/0016235 A1* | 1/2008 | Ascoli et al. | 709/230 |
| 2008/0140230 A1* | 6/2008 | Bromley | 700/87 |
| 2008/0313006 A1* | 12/2008 | Witter et al. | 700/291 |
| 2009/0083648 A1* | 3/2009 | Baier et al. | 707/E17.008 |
| 2009/0125983 A1* | 5/2009 | Kassou et al. | 726/4 |
| 2009/0228122 A1* | 9/2009 | Baier et al. | 700/83 |
| 2009/0259676 A1* | 10/2009 | Yamada et al. | 707/E17.044 |
| 2010/0114994 A1* | 5/2010 | Huang et al. | 707/E17.044 |
| 2010/0198382 A1* | 8/2010 | Gaeta | 700/97 |
| 2010/0229151 A1* | 9/2010 | Yuan et al. | 717/104 |
| 2010/0299517 A1* | 11/2010 | Jukic et al. | 713/150 |
| 2011/0106276 A1* | 5/2011 | Donnell et al. | 700/19 |

OTHER PUBLICATIONS

Younis, B. and Frey, G., "UML-Based Approach for the Re-Engineering of PLC Programs", Nov. 2006, $32_{nd}$ Annual Conference on IEEE Industrial Electronics, pp. 3691-3696.*

KORS Engineering, "Presenting PLC Data Using Internet Standard Protocols (HTML, RSS, XML, etc): A Toolset to Bridge the Gap, A White Paper", Sep. 17, 2007, Retrieved from the Internet [www.korsengineering.com/?Articles.show.82] on Nov. 29, 2011.*

OPTO 22, "Software for Programmable Automation Controllers (PACs)—White Paper", 2007, Form 1335-070717, retrieved from the Internet [www.opto22.com] on Nov. 22, 2011.*

OPTO 22, "Considerations for Choosing a Programmable Automation Controller (PAC)—White Paper", 2007, Form 1733-080206, retrieved from the Internet [www.opto22.com] on Nov. 22, 2011.*

OPTO 22, "PAC Project 8.0 Release Notes", 2006, Form 1680-070608, retrieved from the Internet [www.opto22.com] on Nov. 22, 2011.*

* cited by examiner

PARAMETER SETTING SYSTEM AND METHOD FOR PROGRAMMABLE LOGIC CONTROLLER

BACKGROUND

1. Technical Field

The present disclosure relates to programmable logic controller (PLC) and, particularly, to a parameter setting system and method for PLC.

2. Description of Related Art

With development of automation, PLCs are used widely. At present, when an operator of a PLC needs to change a parameter of the PLC, such as input parameter (I), output parameter (O), command parameter (C), state parameter (S), auxiliary parameter (A), and register parameter (R), she must change scale value of the parameter. However, the operator of the PLC needs to use programs to make corresponding changes to the scale value of the parameter. This process is operationally complex and inconvenient.

DETAILED DESCRIPTION

Figure 1:
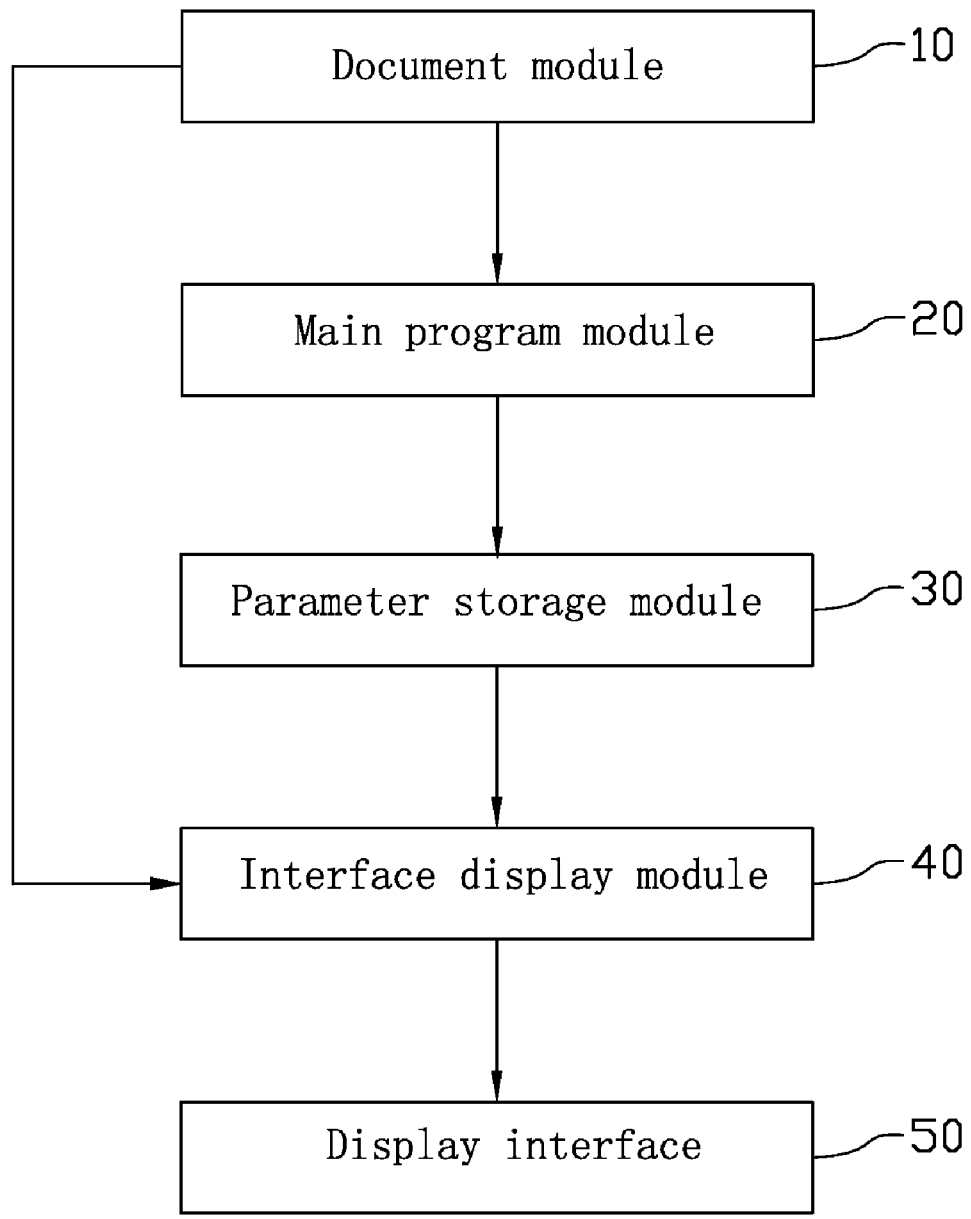
FIG. 1 is a block diagram of an embodiment of a parameter setting system for programmable logic controller (PLC).

Referring to FIG. 1, an exemplary embodiment of a parameter setting system for programmable logic controller (PLC) includes a document module 10, a main program module 20, a parameter storage module 30, an interface display module 40, and a display interface 50.

The document module 10 is configured to store application documents and an extensible markup language (XML) document of the PLC. The XML document includes names and scale values of parameters I, O, C, S, A, and R. For example, scale value of the parameter C is 0-512, (as shown in table 1 below). The scale value of each of parameters in the XML document is used in succeeding process of PLC. The main program module 20 is configured to read the XML document from the document module 10 and store the name and scale value of each of the parameters of the XML document in the parameter storage module 30, and output a control signal to the interface display module 40. The interface display module 40 receives the control signal from the main program module 20 and reads the names and scale values of the parameters I, O, C, S, A, and R stored in the parameter storage module 30, and displays the names and scale values of the parameters via the display interface 50. A operator of a PLC selects a parameter name on the display interface 50 and sets the value of the parameter according to scale value corresponding to the parameter name.

TABLE 1

| IOCSA name | | | | | | | | | |
|---|---|---|---|---|---|---|---|---|---|
| | IB | IK | OB | OK | C | S | AB | AM | AG |
| IOCSA scale value | 384 | 128 | 384 | 128 | 512 | 512 | 1024 | 512 | 512 |

| R name | | | | | |
|---|---|---|---|---|---|
| | R | Ra | Rb | Rc | Rd |
| R scale value | 256 | 256 | 1024 | 2048 | 6656 |

Before using, the operator of the PLC creates an XML document, which includes the names and scale values of the parameters I, O, C, S, A, and R. The XML document is placed in the document module 10 of PLC, and in a same path as application documents of PLC. When initializing PLC, the main program module 20 reads the XML document from the document module 10 and stores the names and scale values of the parameters I, O, C, S, A, and R of the XML document, and outputs a control signal to the interface display module 40. The interface display module 40 reads the names and scale values of the parameters I, O, C, S, A, and R stored in the parameter storage module 30, and displays the names and scale values of the parameters via the display interface 50. The operator of the PLC selects a parameter name on the display interface 50, and sets a value of the parameter according to the scale value of the selected parameter. The value of the selected parameter will be used in succeeding process for the PLC after the value of the selected parameter is set. If value of the parameter needed by the operator is beyond scale value of the parameter on the display interface 50, the scale value can be changed on the display interface 50 by changing the scale value of the parameter in the XML document, so that the operator can select the needed value.

For example, if the maximum scale value of parameter C is 512, then the value of parameter C can be selected from 0-512 on the display interface 50. Namely, the parameter name of the parameter C is selected on the display interface 50, the value from 0 to 512 can be used by PLC. If the value of the parameter C is 600, which is greater than the maximum scale value 512, the scale value of parameter C in XML document must be changed in order to make the value of the parameter C valid. For example, the maximum scale value of the parameter C is changed to 1024, and then the value 600 and other values from 0 to 1024 of the parameter C can be used by PLC.

Figure 2:
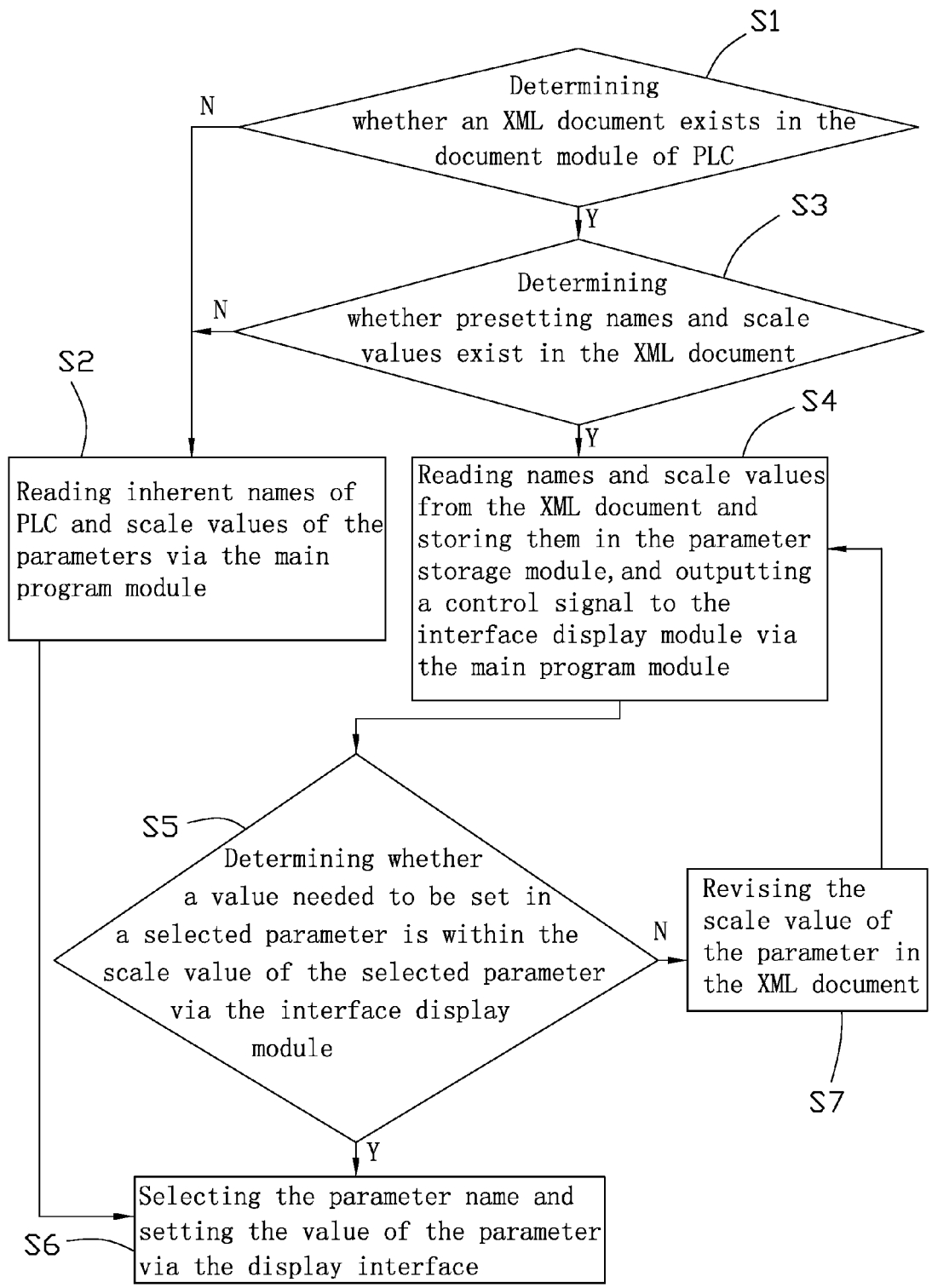
FIG. 2 is a flowchart of an embodiment of a parameter setting method for programmable logic controller (PLC).

Referring to FIG. 2, an exemplary embodiment of a parameter setting method for a PLC includes the following steps.

Step S1: determining whether an XML document exits in the document module 10 of PLC using the main program module 20.

Step S2: if the XML document does not exist, the main program module 20 reads inherent names and scale values of the parameters I, O, C, S, A, and R of PLC, and applies the parameters to succeeding process for PLC.

Step S3: If the XML document exists, the main program module 20 determines whether presetting names and scale values of the parameters exist in the XML document; if not, then go back to step S2.

Step S4: if yes, the main program module 20 reads the names and scale values of the parameters from the XML document and storing them in the parameter storage module 30, and outputting a control signal to the interface display module 40.

Step S5: the interface display module 40 receives the control signal from the main program module 20 and controls the display interface 50 to display the names and scale values according to the control signal, and determines whether a value needed to be set in a selected parameter is within the scale value of the selected parameter.

Step S6: if yes, selecting the parameter name and setting the needed value of the parameter on the display interface 50, and applying the setting value to succeeding process for the PLC.

Step S7: if no, revising the scale value of the parameter in the XML document, and then go back to step S4.

The parameter setting system and method for a PLC uses an XML document which includes names and scale values of the parameters I, O, C, S, A, and R in document module 10 of the PLC. The main program module 20 reads the XML document and stores the names and scale values of the parameters I, O, C, S, A, and R from the XML document in the parameters storage module 30, and outputs a control signal to the interface display module 40. The interface display module 40 reads names and scale values of the parameters from the parameter storage module 30 and controls the display interface 50 to display the names and scale values. Operations of PLC set value of each of the parameters on the display interface 50, and revising names and scale values of the parameters I, O, C, S, A, and R in the XML document in order to change the maximum scale value of the parameters on the display interface 50. The parameter setting system and method for PLC is operationally simple and convenient.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching. The embodiments were chosen and described in order to explain the principles of the disclosure and their practical application so as to enable others skilled in the art to utilize the disclosure and various embodiments and with various modifications as are suited to the particular use contemplated. Alternately embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A parameter setting method for setting parameter for a programmable logic controller (PLC), the parameter setting method comprising:

determining whether an XML document exists in the document module of the PLC via a main program module;

if not, reading inherent names and scale values of the parameters of the PLC via the main program module;

if yes, determining whether the preset names and scale values of the parameters exist in the XML document via the main program module, if not, go to reading inherent names and scale values of the parameters of the PLC via the main program module;

if yes, reading names and scale values of the parameters from the XML document and storing them in the parameter storage module, and outputting a control signal to the interface display module via the main program module;

receiving the control signal from the main program module and controlling the display interface to display the names and scale values of the parameters according to the control signal, and determining whether a value needed to be set in a selected parameter be within the scale value of the selected parameter via the interface display module;

if yes, selecting the parameter name and setting the value of the needed parameter via the display interface; and if not, revising the scale value of the parameter in the XML document, go to reading names and scale values from the XML document and storing them in the parameter storage module, and outputting a control signal to the interface display module via the main program module.

2. The parameter setting method of claim 1, wherein the parameters in the XML document respectively represent input parameter, output parameter, command parameter, state parameter, auxiliary parameter, and register parameter.

* * * * *